(12) United States Patent
Wang

(10) Patent No.: US 9,671,923 B2
(45) Date of Patent: Jun. 6, 2017

(54) MULTI-VIEW MODEL FOR MOBILE APPLICATIONS BASED ON DOUBLE STACKS

(71) Applicant: Yifei Wang, Shanghai (CN)

(72) Inventor: Yifei Wang, Shanghai (CN)

(73) Assignee: SAP SE, Walldorf (DE)

( * ) Notice: Subject to any disclaimer, the term of this patent is extended or adjusted under 35 U.S.C. 154(b) by 424 days.

(21) Appl. No.: 14/316,801

(22) Filed: Jun. 27, 2014

(65) Prior Publication Data
US 2015/0378536 A1 Dec. 31, 2015

(51) Int. Cl.
*G06F 3/0484* (2013.01)
*G06F 3/0481* (2013.01)

(52) U.S. Cl.
CPC .................... *G06F 3/0481* (2013.01)

(58) Field of Classification Search
CPC .......................... G06F 3/0484; G06F 3/0482
See application file for complete search history.

(56) References Cited

U.S. PATENT DOCUMENTS

| | | | |
|---|---|---|---|
| 2003/0066031 A1* | 4/2003 | Laane | G06F 17/30899 715/234 |
| 2006/0161861 A1* | 7/2006 | Holecek | G06F 17/30994 715/782 |
| 2007/0028268 A1* | 2/2007 | Ostojic | G06F 3/0482 725/52 |
| 2011/0066982 A1* | 3/2011 | Paulsami | G06F 3/0482 715/835 |
| 2012/0036456 A1* | 2/2012 | Grunberger | G06F 3/04815 715/760 |

* cited by examiner

*Primary Examiner* — Anil Bhargava
(74) *Attorney, Agent, or Firm* — Horizon IP Pte. Ltd.

(57) ABSTRACT

Disclosed herein are technologies for implementing a multi-view model for devices using a plurality of stack registers. In some implementations, front-stack and back-stack registers enable a user to keep multiple views simultaneously and facilitate fast switching from one view to another without losing any unsaved data in each view.

20 Claims, 6 Drawing Sheets

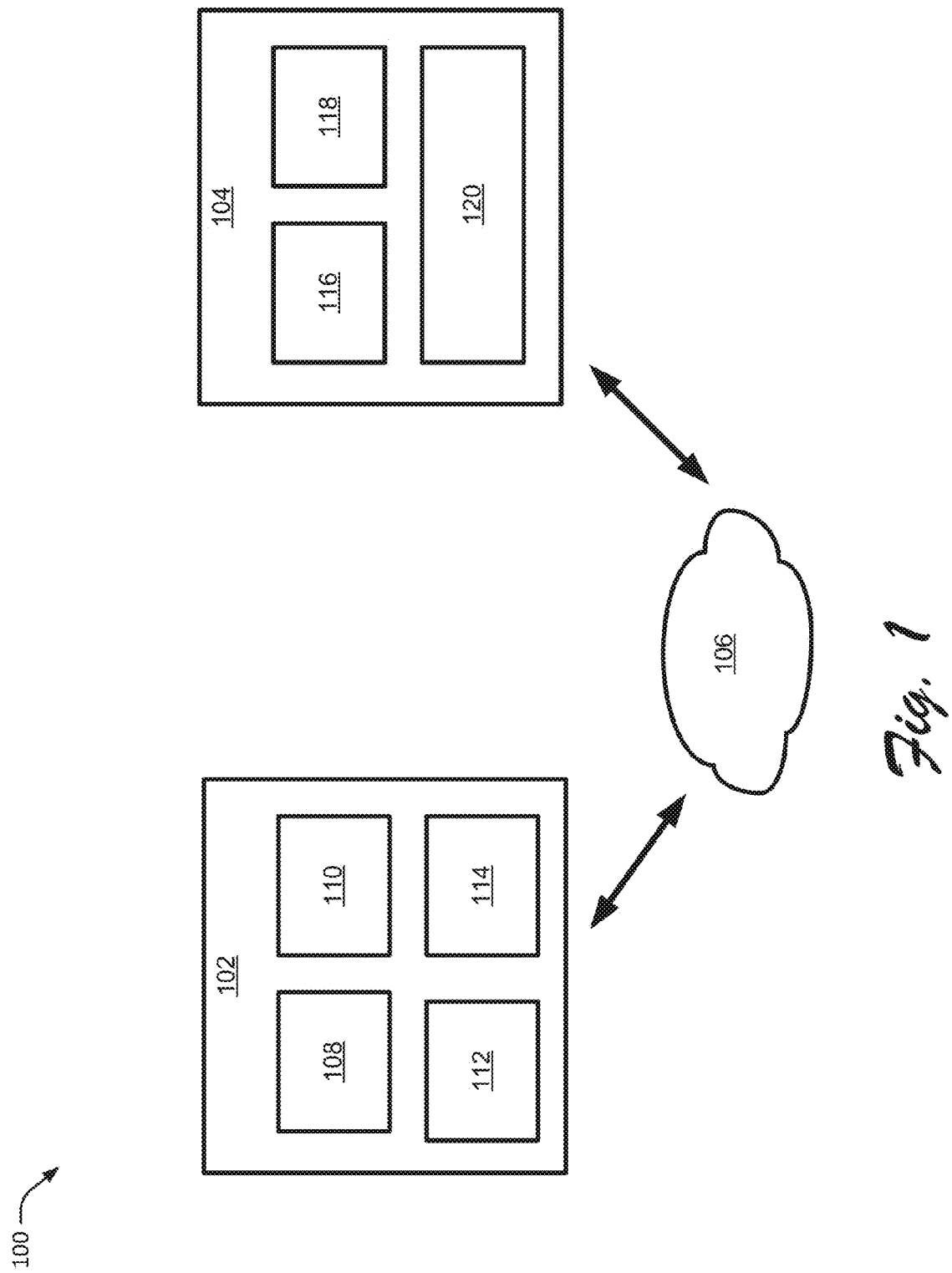

MULTI-VIEW MODEL FOR MOBILE APPLICATIONS BASED ON DOUBLE STACKS

TECHNICAL FIELD

The present disclosure relates generally to a framework for implementing a multi-view model for devices.

BACKGROUND

Multi-tasking in desktop applications is quite common, in which a user may open several child windows to view and operate different objects in the main window of the same program. As for mobile applications, however, this is quite another story. An ever-decreasing size of mobile devices often limits contents that may be displayed on the screen, so that different objects or views may hardly be shown together. Due to this limitation, mobile applications often use a certain navigation sequence among different views or function modules.

Furthermore, navigation between different views or function modules often discards intermediate data in between navigation. For example, in the case of online purchasing, the user often loses the entered information when switching back to a history view window or to another function module. In this example, the user usually spends a lot of time re-entering lost information and completing even a simple online purchasing order.

For mobile applications with more complicated functions, this problem may be worse, since the history of view navigation sequence can be deeper. For example, this disadvantage of mobile applications is more critical for Enterprise Resource Planning (ERP) systems, because the ERP systems usually have many functionalities and the operation sequence is also complex.

SUMMARY

Disclosed herein are technologies for a framework for implementing a multi-view model for devices. One aspect of the present framework may include loading a first view window that is located on top of a first stack register, receiving a user-input, and switching to a second view window based on the user-input. The second view window replaces the first view window on top of the first stack register. The replaced first view window may be stored in a second stack register and the second view window may be loaded.

In accordance with another aspect, the framework may include a first stack register that includes a first view window located on top of the first stack register, and a second stack register that stores a replaced first view window. A controller may be configured to receive a user-input and facilitate switching to a second view window based on the user-input. The second view window replaces the first view window on top of the first stack register.

This summary is provided to introduce a selection of concepts in a simplified form that are further described below in the following detailed description. It is not intended to identify features or essential features of the claimed subject matter, nor is it intended to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 illustrates an exemplary multi-view model system as described in present implementations herein;

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 2A:
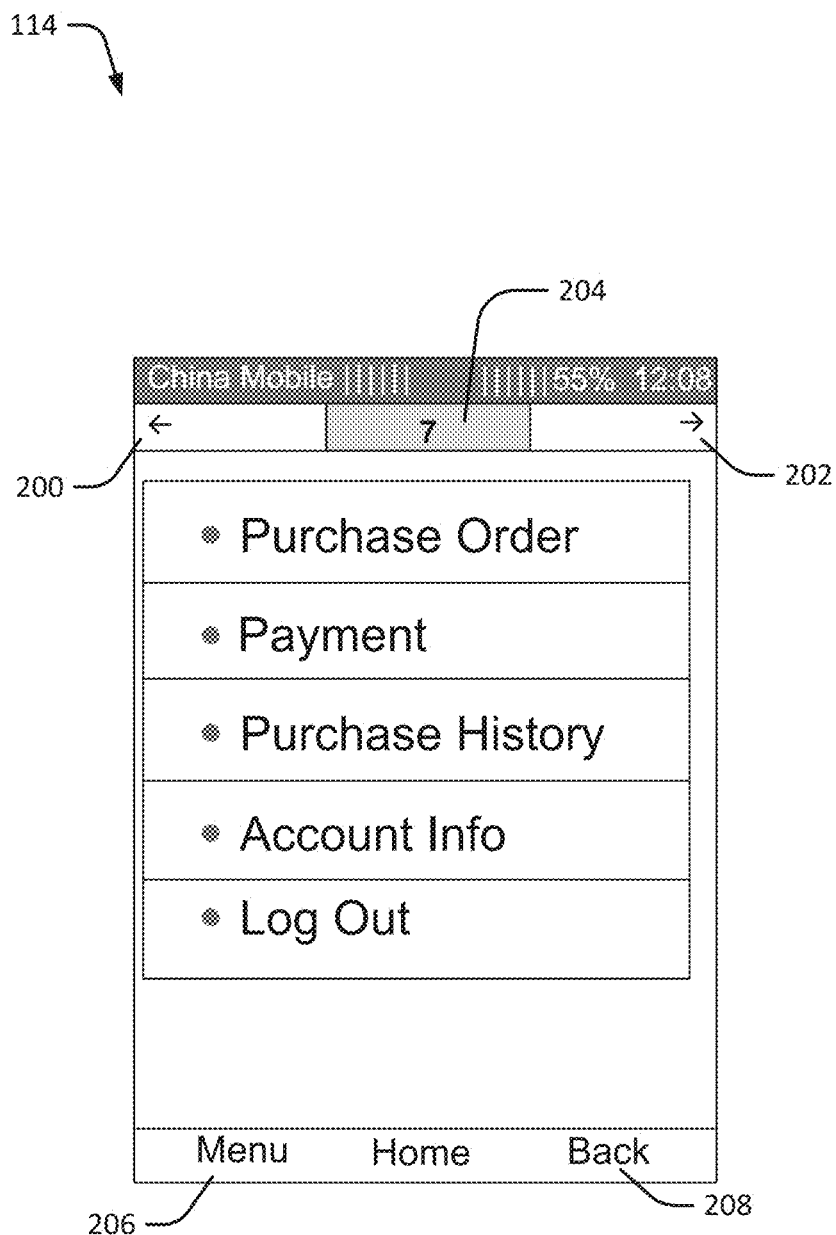
FIGS. 2A to 2C illustrate different implementations of a user interface as described in present implementations herein.

Disclosed herein are technologies for implementing a multi-view model for devices using a plurality of stack registers. Examples of users include individuals, business or corporate entities, etc. Technologies herein may be applied to computing and mobile applications.

FIG. 1 shows an exemplary multi-view model system 100 as described in present implementations herein. As shown, the multi-view model system 100 includes a client 102, a server 104, and a network 106 that provides a communication link between the client 102 and the server 104. Furthermore, the client 102 has a controller 108, a front-stack register 110, a back-stack register 112, and a user interface 114. On the other hand, the server 104 has a database 116, a session management component 118, and an update manager component 120.

As an initial overview of the multi-view model system 100, a user (not shown), for example, opens one or more web and/or mobile applications that may generate multiple view windows at the client 102. The multiple view windows may include a main window and/or several child windows of the one or more web and/or mobile applications. For example, a particular web application such as, an Enterprise Resource Planning (ERP) system has a main window and several child windows. In this example, navigating through the several child windows may require intermediate data to be saved for future use. To this end, the navigation may be implemented and managed by the controller 108 using the front-stack register 110 and the back-stack register 112.

Examples of the client 102 may include (but are not limited to) a mobile phone, a cellular phone, a smartphone, a personal digital assistant, a netbook, a notebook computer, a multimedia playback device, a digital music player, a digital video player, a navigational device, a digital camera, and the like.

In an implementation, the client 102 may run different mobile web applications in its browser or operating system. One of the mobile web applications, for example, may implement the multi-view model system 100 at the client side. In this example, the implementation may utilize the controller 108 that manipulates and manages switching operations in the front-stack register 110 and the back-stack register 112.

To navigate or change from a current view to another view, switching operations such as a switch-forward, a switch-back, a step-forward and a step-back operation are herein defined. The switch-forward operation, for example, involves popping-out a previous view from the back-stack register 112 and pushing this previous view to the front-stack register 110. On the other hand, the switch-back operation involves popping-out a view from top of the first-in-last-out (FILO) type front-stack register 110 and pushing this view to the back-stack register 112. In these operations, the popped-out view and its corresponding unsaved data are not discarded. Rather, the popped-out view is placed in the background (i.e., stored at the back-stack register 112) and its predecessor may automatically become a top element of the front-stack register 110 to replace screen content. The replacement of the screen content, for example, is facilitated by the controller 108.

The step-forward operation involves creating a new view and pushing the created new view into the top of the FILO front-stack register 110. On the other hand, the step-back operation involves popping-out and discarding the created new view from the top of FILO front-stack register 110. In these operations, the step-forward and step-back operations may not involve saving of intermediate data during the process. As further described below, a program logic to implement an overlay view operation may utilize the step-forward and step-back operations because the created view in the overlay view operation is configured to disappear after another operation takes effect.

With continuing reference to FIG. 1, an illustrative implementation of the above switching operations may be demonstrated through a tree-like structure of a view switch sequence. For example, the tree-like structure is illustrated in the following Table 1:

TABLE 1

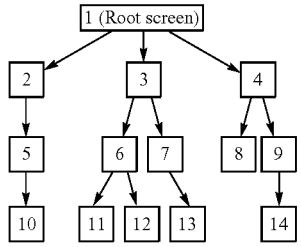

In an implementation, the front-stack and back-stack registers 110 and 112 enable the user to keep multiple views simultaneously and facilitate fast switching from one view to another without losing any unsaved data in each view. The front-stack register 110 and the back-stack register 112 are particular implementations of data collection in which a principal operation for the data collection involves addition of an entity to the collection, known as "push" and removal of an entity, known as "pop." The relation between the push and pop operations is such that the stack resembles a Last-In-First-Out (LIFO) data structure.

For example, based on the tree-like structure, switching from view 1 to view 13 involves the following series of operations illustrated in Table 2 in the front-stack register 110 and the back-stack register 112:

TABLE 2

| Steps | 1 | | 2 | | 3 | | 4 | |
|---|---|---|---|---|---|---|---|---|
| Stacks | | | | | | | 13 | |
| | | | | | 7 | | 7 | |
| | | | 3 | | 3 | | 3 | |
| | 1 | | 1 | | 1 | | 1 | |
| | Front | Back | Front | Back | Front | Back | Front | Back |

As shown, step 1 shows the root-screen (or view 1) occupying the top of the front-stack register 110. Step 2 shows pushing view 3 on top of view 1. Step 3 shows pushing view 7 on top of view 3, and step 4 shows pushing view 13 to the top of the front-stack register 110. At step 4, view 13—being at the top—appears at the screen display or the user interface 114 of the client 102.

In the above example, switching from view 13 to view 10 may further involve the following series of operations shown in Table 3:

TABLE 3

| Steps | 5 | | 6 | | 7 | | 8 | |
|---|---|---|---|---|---|---|---|---|
| Stacks | | | | | | | 3 | 3 |
| | 7 | | | | | | 7 | 7 |
| | 3 | | 3 | 7 | | | 2 | 2 |
| | 1 | 13 | 1 | 13 | 1 | 13 | 1 | 13 |
| | Front | Back | Front | Back | Front | Back | Front | Back |
| Steps | 9 | | 10 | | | | | |
| Stacks | | | 10 | | | | | |
| | 5 | 3 | 5 | 3 | | | | |
| | 2 | 7 | 2 | 7 | | | | |
| | 1 | 13 | 1 | 13 | | | | |
| | Front | Back | Front | Back | | | | |

Steps 5-7 shows popping-out of views 13, 7 and 3, respectively, and placing these popped-out views 13, 7 and 3 in the background or the back-stack register 112. These operations (i.e., steps 5-7) may be implemented by a switch-back operation in the program logic that implements the multi-view model system at the client side. Table 3 further shows step-forward operations in steps 8-10 to create new views 2, 5, and 10, respectively, and placing these created new views 2, 5, and 10 in the front-stack register 110. During these step-forward operations, the contents of the back-stack register 112 remain the same and are not discarded.

In another exemplary switching operation, a switch-forward operation for view 3 and step-forward operations to create new views 7a and 13a are demonstrated as follows in Table 4:

TABLE 4

| Steps | 11 | | 12 | | 13 | |
|---|---|---|---|---|---|---|
| Stacks | | | | | 13a | |
| | | | 7a | | 7a | |
| | 3 | | 3 | | 3 | |
| | 10 | | 10 | | 10 | |
| | 5 | | 5 | | 5 | |
| | 2 | 7 | 2 | 7 | 2 | 7 |
| | 1 | 13 | 1 | 13 | 1 | 13 |
| | Front | Back | Front | Back | Front | Back |

As shown in steps 11-13, two instances that include a first set of views 7 and 13 and another set of views 7a and 13a may include different data. The reason being, the set of views 7a and 13a are products of the step-forward operation and as such, views 7a and 13a are not popped-out from the back-stack register 112. In a case where the user needs the data on views 7 and 13, switch-forward operations will pop out views 7 and 13 from the back-stack register 112 and push them into the front-stack register 110.

In another implementation, the switch-back and switch-forward operations may be performed repeatedly by a single user input. For example, the program logic displays a "display view list" function to display all views that are currently stored in the two stacks. In this example, the user may select and switch directly to one of the views in the displayed views. In such cases, the program logic needs to repeatedly perform switch-forward or switch-back operations (in memory) until the selected view is on the top of the front-stack register 110.

Although the switch-forward and the switch-back operations may navigate between views without discarding any information, these operations may not be suitable in other operations involving pairs of views. For example, a view is created by its predecessor in order to receive user's input for data collecting. Switching back from such views to their predecessors may not make sense to the program logic and may cause unexpected behaviors unless the user's input is collected.

For example, when creating a purchase order, clicking on the "Vendor" field of the order may step forward to a new view of a vendor list and allow the user to choose from it. In such a case, the user may not be allowed to switch back to the "order view" because the program logic is waiting for the return value of the vendor list view to go to the next step. In desktop applications, such new views are called modal dialogs. That is, the parent window of a modal dialog is not responsive until the dialog window is closed, and the modal dialog windows can have further modal dialog children windows on top of it, which follow a stack-like (FILO) opening and closing order.

In an implementation, a modal view operation is defined in the program logic as a logic that makes the parent views unresponsive until they are closed by either step-back operation (i.e., data discarded) or confirmation (i.e., data returned). The modal views cannot switch back to their predecessors, and as such, the switching operation is performed at the same time with its predecessor. If the predecessor itself is also a modal view, then the switching operation is further performed with its predecessor until the view is not a modal view. This switching operation is referred to as "view binding." That is, the modal view, its modal predecessors, and the first non-modal predecessor are bound together, and they move together during the switch-forward and switch-back operations.

As an exemplary illustration, following the example above, if the view 13 is a modal view of the view 7, then switching back to the root-screen (view 1) from the view 13 is demonstrated as follows in Table 5:

TABLE 5

| Steps | 0(initial) | | 1 | | 2 | |
|---|---|---|---|---|---|---|
| Stacks | 13 | | | | | 3 |
| | 7 | | | | | 7 |
| | 3 | | 3 | 7 | | 13 |
| | 1 | | 1 | 13 | 1 | |
| | Front | Back | Front | Back | Front | Back |

As shown, the switch-back operation moves together the views 13 and 7 in a single operation. That is, step 1 pops out views 13 and 7 together, and then step 2 pops out view 3 to show the root-screen at the screen display. During switch-forward operation, a reverse order is observed.

In another implementation, the root-screen or the main menu serves as the main window for all other views and is frequently accessed. As such, the root-screen or the main menu is made as an overlay view. For example, the overlay view is invoked by a specific operation such as a menu button, which is visible on the screen all the time. In this example, invoking the overlay view creates a new instance of itself, and the new instance is pushed to the top of the front-stack register 110.

The overlay view is configured not to enter or be pushed back to the back-stack register 112. In other words, switch-forward and switch-back operations may not apply; however, the overlay view may be subjected to step-forward and step-back operations. When stepped back, it pops out from the front-stack register 110 and discards itself just like all other views. When stepped forward (e.g., the user selects something to open from the main menu), the overlay view creates a new instance of the indicated successor view, but unlike other views, it pops out from the front-stack register 110 and discards itself before pushing the new created successor view to the top of the front-stack register. In other words, the overlay view disappears after any single operation takes effect, just like a menu disappears after any menu item is selected.

For example, the stack registers have the following initial state as shown in Table 6:

TABLE 6

| Steps | 0(initial) | |
|---|---|---|
| Stacks | 13 | |
| | 7 | |
| | 3 | |
| | 1 | |
| | Front | Back |

At this state, invoking the overlay view (i.e., view 1) and opening view 4 may have the following series of operations as shown in Table 7:

TABLE 7

| Steps | 1 | | 2 | |
|---|---|---|---|---|
| Stacks | 1a | | 4 | |
| | 13 | | 13 | |
| | 7 | | 7 | |
| | 3 | | 3 | |
| | 1 | | 1 | |
| | Front | Back | Front | Back |

As shown, step 1 has two instances of view 1 in which view 1a is the new instance created by the invocation of the overlay view. At the instance that view 4 is pushed or created, the overlay view 1a immediately discards itself.

As an example of present implementations herein, the client 102 may connect with an underlying High-Performance Analytic Appliance (HANA) database 116 in order to store content or retrieve the one or more web applications. The HANA database may be implemented or found, for example, at the server side (i.e., server 104). At the server 104, the session management component 118 facilitates a connection between the client 102 and the underlying HANA database 116 that may be found at the server 104. Furthermore, the server 104 may include the update manager component 120 to operate the HANA database 116.

Figure 2B:
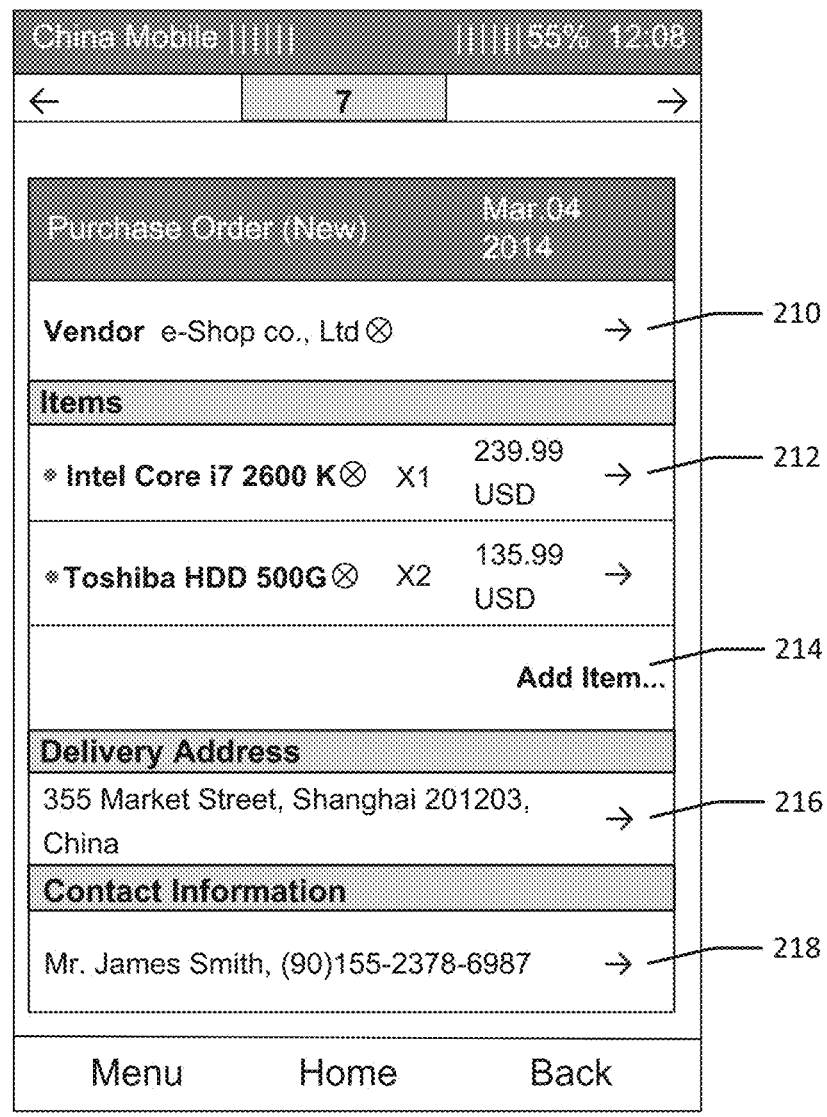
Figure 2C:
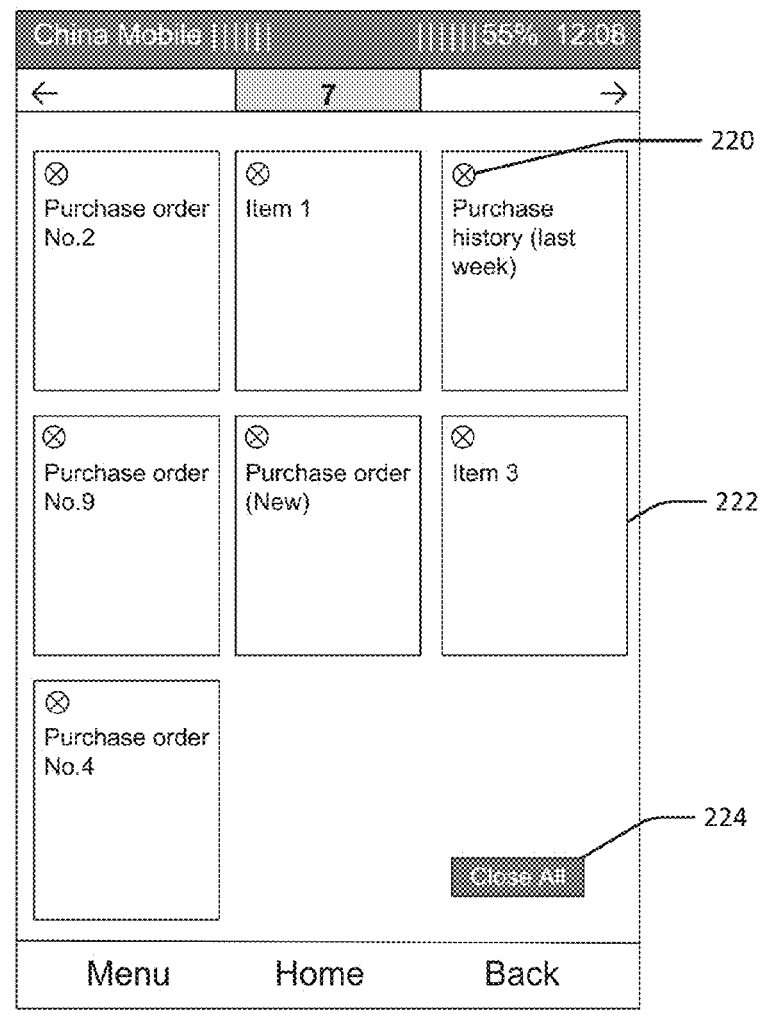

FIGS. 2A-2C show exemplary implementations of the user interface 114 during the switching operations. As illustrated in FIG. 2A, multiple buttons and selections on the user interface 114 are implemented through switch-forward, switch-back, step-forward, and step-back operations. These operations basically adopt the pushing and popping of views at the stack registers.

For example, during an online purchase application, the user interface 114 may display the following: an arrow 200 for a switch-back operation (i.e., screen display slips right), an arrow 202 for a switch-forward operation (i.e., screen display slips left), a button 204 that indicates number of all active views (e.g., number 7 denotes a total of 7 views opening), a button 206 that invokes main menu as an overlay view, and a button 208 for step-back operation.

In the above example, clicking the "Purchase Order" implements a step-forward operation that generates the "Purchase Order View" as shown in FIG. 2B. Furthermore, arrow 210 shows a button for step-forward operation to view "vendor details," arrow 212 shows a button for another step-forward operation to display "item details," arrow 214 shows a button for a step-forward operation to display additional item list, arrow 216 shows a button for a step-forward operation to change address, and arrow 218 shows a button for a step-forward operation to change contact information. For views generated through buttons 214-218, the views may include modal views that are bound with current screen display.

With continuing reference to FIG. 2C, clicking the button 204 displays the seven active views. As shown, an arrow 220 shows a button for closing a particular active view, an arrow 222 shows a thumbnail display of the active views, and an arrow 224 shows a button for closing all the active views.

In all of the FIGS. 2A-2C, the switching operations as described in FIG. 1 above facilitates navigation of one view to another view without losing the intermediate data in-between navigation.

Figure 3:
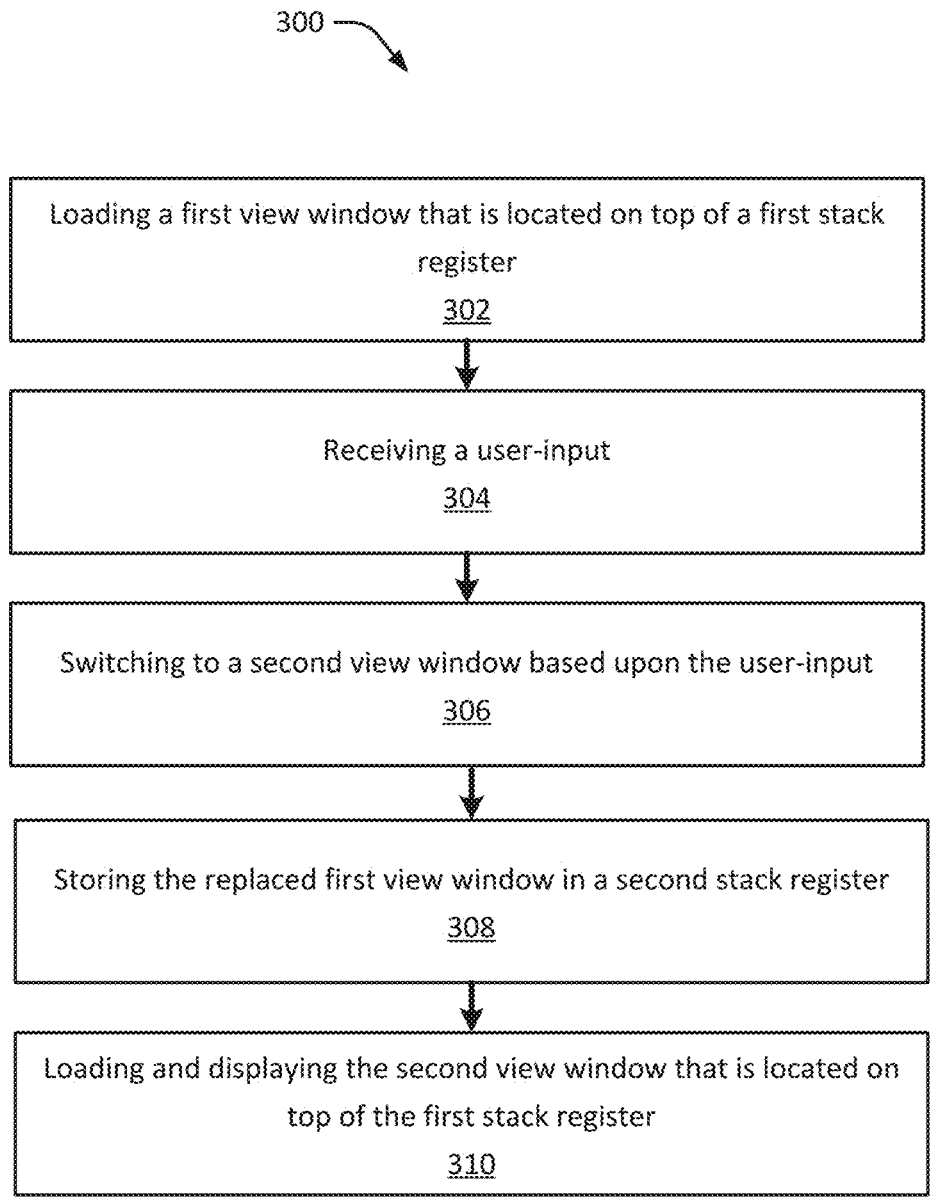
FIG. 3 illustrates an exemplary process for implementing, at least in part, the technology described herein.

FIG. 3 illustrates an exemplary process 300 for implementing, at least in part, the technology described herein. In particular, process 300 depicts a flow to implement a method of implementing a multi-view model for devices using a plurality of stack registers. The process 300 may be performed by a computing device or devices. An exemplary architecture of such a computer device is described below with reference to FIG. 4. In this particular example, the process 300 describes that certain acts are to be performed at or by a user or a system.

At 302, loading a first view window that is located on top of a first stack register is performed. For example, the first stack register is the front-stack register 110 and the first view is a root-screen (e.g., main menu of ERP system) that is placed at the top of said front-stack register 110.

In another implementation, the root-screen may be an overlay view, which is invoked by a specific operation. For example, the root-screen is a menu button that is visible on the screen all the time. When the overlay view is invoked, the invocation creates a new instance of itself by loading the root-screen at the top of the front-stack register 110 even though another main menu containing different data is currently placed at the bottom of the front-stack register 110. A successor view that is pushed into the front-stack register 110 during a step-forward or switch-forward operation makes the overlay view discard itself. That is, the created new instance discards itself and is not saved or placed in the background.

At 304, receiving a user-input is performed. For example, the user-input may include a selection such as a "purchase order" selection from the root-screen of the ERP system. In this example, the selection may include initiating a switch-forward, a switch-back, a step-forward or a step-back operation.

In an implementation, the controller 108 is configured to receive the user-input that forms the basis for switching operations.

At 306, switching to a second view window based upon the user-input is performed. For example, the user-input involves initiation of switch-back operation. In this example, the controller 108 facilitates the popping out of the current first view window and the next-in-line second view window (i.e., predecessor) becomes the top element of the front-stack register 110.

In an implementation, the current view (i.e., first view window) in the above example may be a modal view. In such a case, the current view is popped-out together with the second view window. In other words, the first and second view windows are bound together during the switch-back operation. Similarly, during a switch-forward operation for the above modal view, the reverse order is observed.

At 308, storing the replaced first view window in a second stack register is performed. For example, the second stack register is the back-stack register 112. In this example, during the switch-back operation, the first window is placed in the background or stored at the back-stack register 112.

At 310, loading and displaying the second view window that is located on top of the first stack register is performed.

Figure 4:
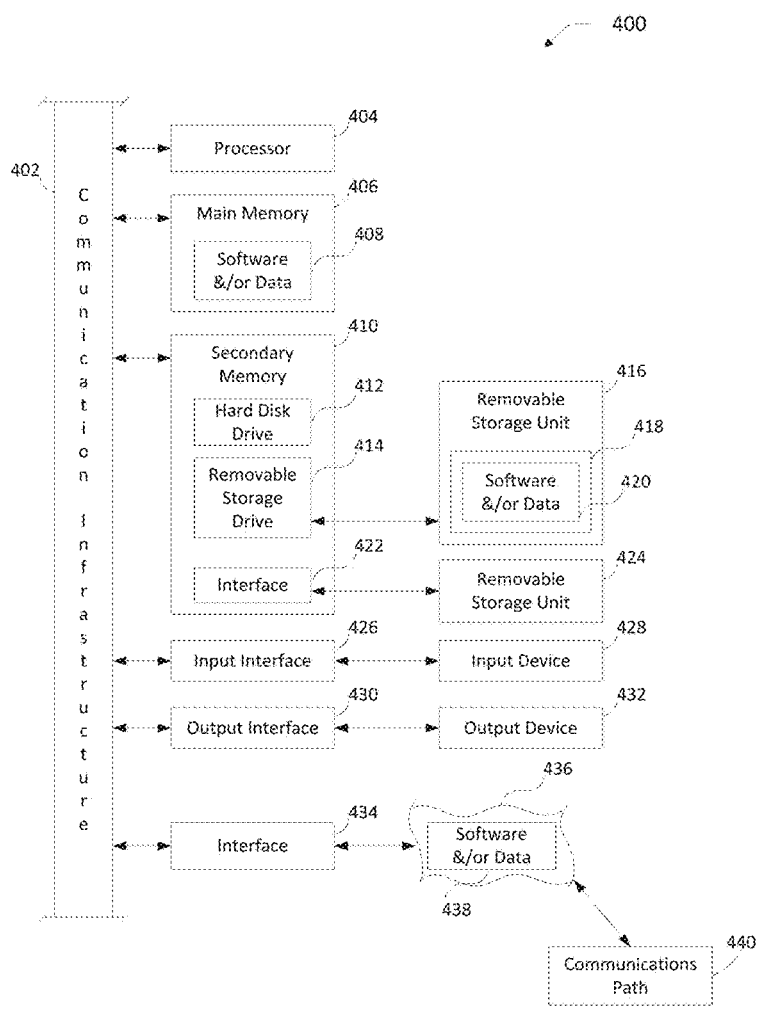
FIG. 4 illustrates an exemplary computing system to implement in accordance with the technologies described herein.

FIG. 4 illustrates an exemplary system 400 that may implement, at least in part, the technologies described herein. The computer system 400 includes one or more processors, such as processor 404. Processor 404 can be a special-purpose processor or a general-purpose processor. Processor 404 is connected to a communication infrastructure 402 (for example, a bus or a network). Depending upon the context, the computer system 400 may also be called a client device.

Computer system 400 also includes a main memory 406, preferably Random Access Memory (RAM), containing possibly inter alia computer software and/or data 408.

Computer system 400 may also include a secondary memory 410. Secondary memory 410 may include, for example, a hard disk drive 412, a removable storage drive 414, a memory stick, etc. A removable storage drive 414 may comprise a floppy disk drive, a magnetic tape drive, an optical disk drive, a flash memory, or the like. A removable storage drive 414 reads from and/or writes to a removable storage unit 416 in a well-known manner. A removable storage unit 416 may comprise a floppy disk, a magnetic tape, an optical disk, etc. which is read by and written to by removable storage drive 414. As will be appreciated by persons skilled in the relevant art(s) removable storage unit 416 includes a computer usable storage medium 418 having stored therein possibly inter alia computer software and/or data 420.

In alternative implementations, secondary memory 410 may include other similar means for allowing computer programs or other instructions to be loaded into computer system 400. Such means may include, for example, a removable storage unit 424 and an interface 422. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 424 and interfaces 422 which allow software and data to be transferred from the removable storage unit 424 to computer system 400.

Computer system 400 may also include an input interface 426 and a range of input devices 428 such as, possibly inter alia, a keyboard, a mouse, etc.

Computer system 400 may also include an output interface 430 and a range of output devices 432 such as, possibly inter alia, a display, one or more speakers, etc.

Computer system 400 may also include a communications interface 434. Communications interface 434 allows software and/or data 438 to be transferred between computer system 400 and external devices. Communications interface 434 may include a modem, a network interface (such as an Ethernet card), a communications port, a Personal Computer Memory Card International Association (PCMCIA) slot and card, or the like. Software and/or data 438 transferred via communications interface 434 are in the form of signals 436 which may be electronic, electromagnetic, optical, or other signals capable of being received by communications 434. These signals 436 are provided to communications interface 434 via a communications path 440. Communications path 440 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 416, removable storage unit 424, and a hard disk installed in hard disk drive 412. Computer program medium and computer usable medium can also refer to memories, such as main memory 406 and secondary memory 410, which can be memory semiconductors (e.g. Dynamic Random Access Memory (DRAM) elements, etc.). These computer program products are means for providing software to computer system 400.

Computer programs (also called computer control logic) are stored in main memory 406 and/or secondary memory 410. Such computer programs, when executed, enable computer system 400 to implement the present technology described herein. In particular, the computer programs, when executed, enable processor 404 to implement the processes of aspects of the above. Accordingly, such computer programs represent controllers of the computer system 400. Where the technology described herein is implemented, at least in part, using software, the software may be stored in a computer program product and loaded into computer system 400 using removable storage drive 414, interface 422, hard disk drive 412 or communications interface 434.

The technology described herein may be implemented as computer program products comprising software stored on any computer useable medium. Such software, when executed in one or more data processing devices, causes data processing device(s) to operate as described herein. Exemplary illustrations of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Micro-electromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more exemplary implementations described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:
1. A method of implementing a multi-view model for devices, the method comprising:
 providing a first stack register, wherein the first stack register is a single stack, the first stack register stores one or more view windows, wherein a view window on top of the first stack register is displayed on a user interface of a device;

providing a second stack register, wherein the second stack register is a single stack, the second stack register receives and stores view windows popped from the first stack register during a switch-back operation;

the multi-view model enables via the first and second stack registers a step-forward operation which creates a new view and pushes it to the top of the first stack register, a step-back operation which pops out a view from the top of the first stack register and discards the view, the switch-back operation which pops out a view from the top of the first stack register and pushes it to the top of the second stack register, and a switch-forward operation which pops out a view from the top of the second stack register and pushes it to the top of the first stack register, displaying on the user interface a first view window that is located on the top of the first stack register;

receiving a user-input to display a second view window;

performing at least a switch-back operation of the multi-view model in response to the user-input, wherein the switch back operation pops out the first view window from the first stack register and pushes it into the second stack register without discarding unsaved data of the first view window;

and displaying the second view window on the user interface when the second view window is located on the top of the first stack register.

2. The method according to claim 1 further comprising performing a step-forward operation to create the second view window in the first stack register.

3. The method according to claim 1 further comprising performing one or more step-back operations to discard one or more view windows in the first stack register based on another user-input to display a third view window.

4. The method according to claim 1, wherein
the first stack register stores view windows in a first-in-last-out manner, and
the second view window is a predecessor of the first view window in the first stack register.

5. The method according to claim 1 further comprising creating at the first stack register, using a step-forward operation in response to another user-input, another instance of a view window which is stored in the second stack register, wherein the created other instance includes different data.

6. The method according to claim 1 further comprising creating an overlay view in response to another user-input and pushing the overlay view to the top of the first stack register, wherein a step forward operation performed on the overlay view causes the overlay view to discard itself from the first stack register before pushing a successor view window to the top of the first stack register.

7. The method according to claim 1, wherein the first view window is a modal view, and the switch-back operation of the first view window is performed at the same time with its predecessor view window which is not a modal view.

8. The method according to claim 1 wherein the user-input comprises a user-selection of the second view window from a display of all view windows stored in the first and second stack registers.

9. The method according to claim 1 further comprising performing at least a switch-forward operation based on another user-input to display the first view window after the display of the second view window, wherein the switch forward operation pops out the stored first view window from the second stack register and pushes the popped out first view window back to the top of the first stack register.

10. A device comprising:
a memory having
a first stack register, wherein the first stack register is a single stack, the first stack register stores one or more view windows, wherein a first view window located on top of the first stack register is displayed on a user interface of the device;
a second stack register, wherein the second stack register is a single stack, the second stack register receives and stores view windows popped from the first stack register during a switch-back operation of a multi-view model; and
a controller configured to receive a user-input, wherein the controller performs the switch-back operation of the multi-view model in response to the user-input to display a second view window, wherein the switch back operation pops out the first view window from the first stack register and pushes it into the second stack register without discarding unsaved data of the first view window, wherein the second view window is displayed on the user interface when the second view window is located on the top of the first stack register.

11. The device according to claim 10, wherein the controller is further configured to perform a step-forward operation to create the second view window in the first stack register.

12. The device according to claim 10, wherein the controller is further configured to perform one or more step-back operations to discard one or more view windows in the first stack register based on another user-input to display a third view window.

13. The device according to claim 10, wherein the controller is further configured to perform a switch-forward operation based on another user-input to display the first view window after the display of the second view window, wherein the switch forward operation pops out the stored first view window from the second stack register and pushes the popped out first view window back to the top of the first stack register.

14. The device according to claim 10, wherein the first stack register stores view windows in a first-in-last-out manner, and the second view window is a predecessor of the first view window in the first stack register.

15. The device according to claim 14, wherein the user-input comprises a user-selection of the second view window from a display of all view windows stored in the first and second stack registers.

16. One or more non-transitory computer-readable media storing processor-executable instructions that when executed cause one or more processors to perform operations comprising:
providing a first stack register, wherein the first stack register is a single stack, the first stack register stores one or more view windows, wherein a view window on top of the first stack register is displayed on a user interface of a device;
providing a second stack register, wherein the second stack register is a single stack, the second stack register receives and stores view windows popped from the first stack register during a switch-back operation;
the first and second stack registers enables a step-forward operation which creates a new view and pushes it to the top of the first stack register, a step-back operation which pops out a view from the top of the first stack register and discards the view, the switch-back operation which pops out a view from the top of the first stack register and pushes it to the top of the second stack register, and a switch-forward operation which pops out a view from the top of the second stack register and pushes it to the top of the first stack register, displaying a first view window that is located on the top of the first stack register;

receiving a user-input to display a second view window;

performing at least a switch-back operation in response to the user-input, wherein the switch back operation pops out the first view window from the first stack register and pushes it into the second stack register without discarding unsaved data of the first view window; and displaying the second view window on the user interface when the second view window is located on the top of the first stack register.

17. The one or more computer-readable media of claim 16 further comprising performing a step-forward operation to create the second view window in the first stack register.

18. The one or more computer-readable media of claim 16 further comprising performing one or more step-back operations to discard one or more view windows in the first stack register based on another user-input to display a third view window.

19. The one or more computer-readable media of claim 16 further comprising performing a switch-forward operation based on another user-input to display the first view window after the display of the second view window, wherein the switch forward operation pops out the stored first view window from the second stack register and pushes the popped out first view window back to the top of the first stack register.

20. The one or more computer-readable media of claim 16, wherein the user-input comprises a user-selection of the second view window from a display of all view windows stored in the first and second stack registers.

* * * * *